United States Patent [19]
Schultz

[11] 3,783,956
[45] Jan. 8, 1974

[54] AUTOMATIC DRIVER

[76] Inventor: Donald J. Schultz, 3505 Silver Creek Rd., Joplin, Mo. 64801

[22] Filed: Jan. 24, 1972

[21] Appl. No.: 220,261

[52] U.S. Cl............................... 173/93.7, 81/52.3
[51] Int. Cl............................................ B25b 19/00
[58] Field of Search.................... 173/13, 93.7, 119; 81/52.3

[56] References Cited
UNITED STATES PATENTS

| | | | |
|---|---|---|---|
| 2,010,616 | 8/1935 | Walsh | 173/93.7 |
| 1,952,395 | 3/1934 | Tillyer et al. | 173/120 X |
| 2,960,864 | 11/1960 | Watts | 173/119 X |

Primary Examiner—Ernest R. Purser

[57] ABSTRACT

This application discloses an automatic driving device of a type suitable for driving conventional screws, threaded fasteners or other fastening devices, opened or closed, by relative rotation. The device incorporates a means of automatically storing energy and releasing the stored energy to impart a controlled torque to a tool capable of rotating a fastening device whil simultaneously exerting axial pressure forcing the tool against the fastening device. The device may be incorporated in a tool suitable for manual use.

15 Claims, 6 Drawing Figures

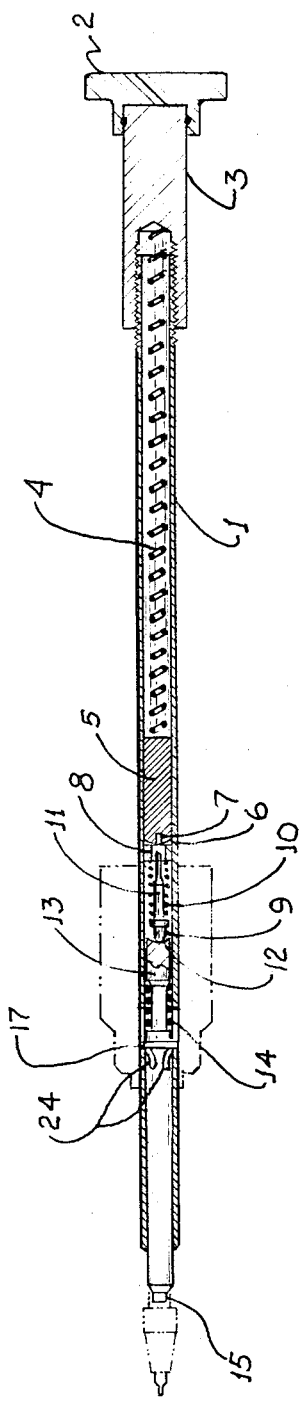
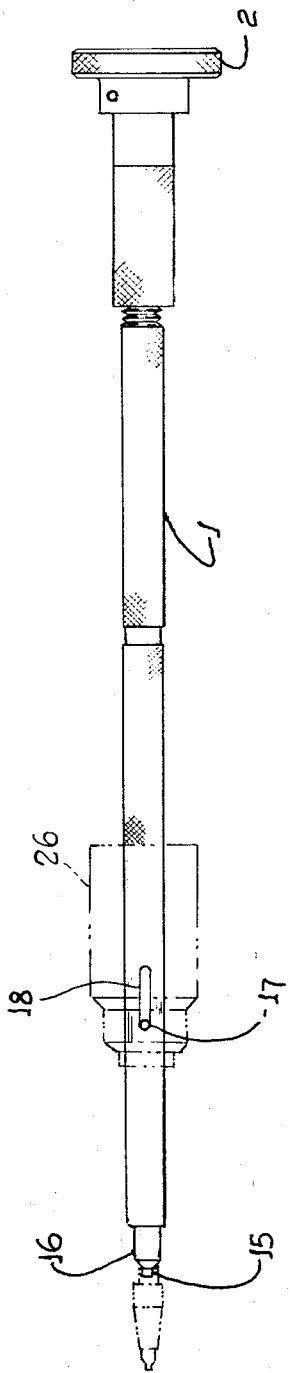
FIG. 1.
FIG. 2.

AUTOMATIC DRIVER

BACKGROUND OF THE INVENTION

Screw threaded and rotating fasteners are commonly used to connect parts of assembled structures. The use is, universal in connecting machinery but many other structures, large and small use rotatable fasteners, ie., furniture and building structures.

Assembling and disassembling structures using rotating fasteners require that the fasteners be individually installed or removed. If the fasteners must be installed or removed by hand, for example by an ordinary wrench or screwdriver, the assembly or disassembly can be very time consuming. This is particularly true of disassembly or assembly in which the fasteners have become stuck, corroded, or have damaged heads.

To reduce the time and effort required in assembly or disassembly operations a variety of tools have been devised to increase the torque and effectiveness of hand tools. These devices usually operate by converting an impact into a rotating motion. Typical devices are found disclosed in U. S. Pat. Nos. 3,435,862, 2,631,484, 2,507,167 and 2,010,616.

SUMMARY OF THE INVENTION

This invention is an automatic driving device which rapidly and conveniently operates to install or remove rotating fasteners, particularly fasteners of the threaded type such as screws and bolts which are commonly used in assembling machines or other structures. The device incorporates a means of storing energy and then releasing the stored energy to impart a strong, sudden torque to a portion of the tool which operates on the fastener, while at the same time forcing the tool against the fastner with an axial pressure to keep the tool from slipping off of the head of a fastener or twisting out of the head of the fastener, without turning it or jumping out of a groove or slot.

Typically the device would be embodied in a manual form. However, mechanically powered devices incorporating electrical or pneumatic power can be used. The preferred embodiment of the device uses a spring which is compressed to increase the potential energy of the spring. When a desired level of energy has accumulated in the spring the energy is released by allowing the spring to expand forcing a weight or hammer to travel in a linear path and strike a rotatable tool. The linear motion kinetic energy imparted to the hammer by the spring is converted to a rotating motion and a torque force by a cam and follower mechanism.

This organization has the particular advantage of allowing fasteners which have been frozen together to the point that they can not be removed, by conventional hand tools for example, to be freed by the sudden impact transmitted by the tool mechanism. Or, conversely, the organization allows fasteners to be tightened to a degree which is not possible by conventional tools. A particular advantage of the instrument is it allow the operator to remove fasteners which have had their head or kerf damaged. The sudden application of a turning force and axial force which the tool transmits to the fastener combines to loosen the fastener so that it may be removed manually throughout the remainder of its travel.

If a kerf is totally destroyed a new one may be cut into the screw with the instrument and the fastener can then be removed.

DESCRIPTION OF THE DRAWINGS

FIG. 1 is a front cutaway sectional view of a device emboding the invention.
FIG. 2 is a front view of the device of FIG. 1.

DESCRIPTION OF THE PREFERRED EMBODIMENT

Figure 3:
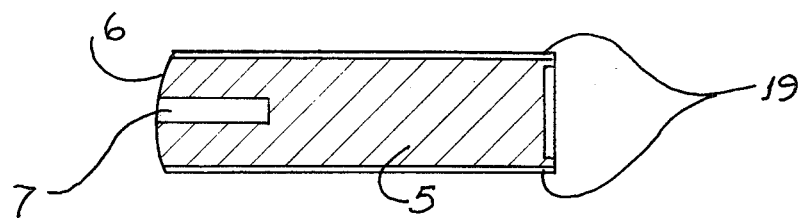
FIG. 3 is a cross sectional view of hammer 5.

As shown by FIG. 1 a driver device having a housing (1) containing a spring (4) which can have its compression adjusted by spring adjustment cap (3). Rotating spindle (2) allows the driver to be held and rotated freely when operated. Spring (4), engages hammer (5) having an inclined face (6) and recessed hole (7) and air passage (19). (Shown in FIG. 3)

Figure 4:
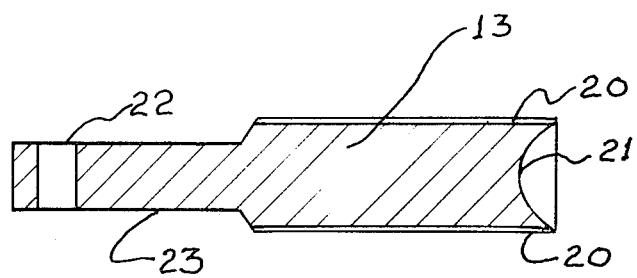
FIG. 4 is a cross sectional view of dowel pin holder 13.

Punch (9) having a centering taper (11) abutts against inclined face (6). Off center spring (10) surrounds the punch and extends from stationary shoulder (8) to collar (12). Punch (9) has a spherical pivot (12) adjacent collar (12) and abutting dowel pin holder (13), at concave recess (21). (Shown in FIG. 4)

Figure 6:
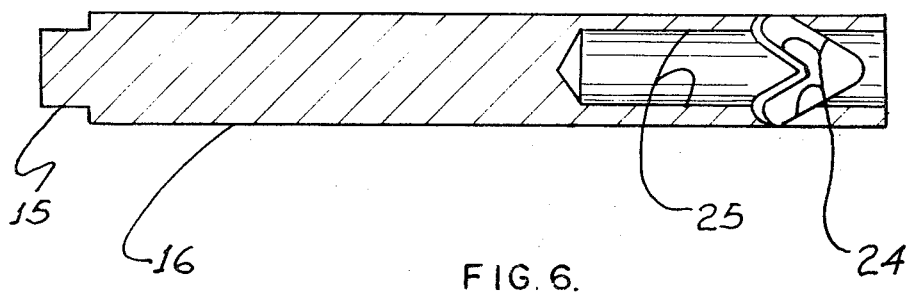
FIG. 6 is a cross sectional view of cam 16.
Figure 5:
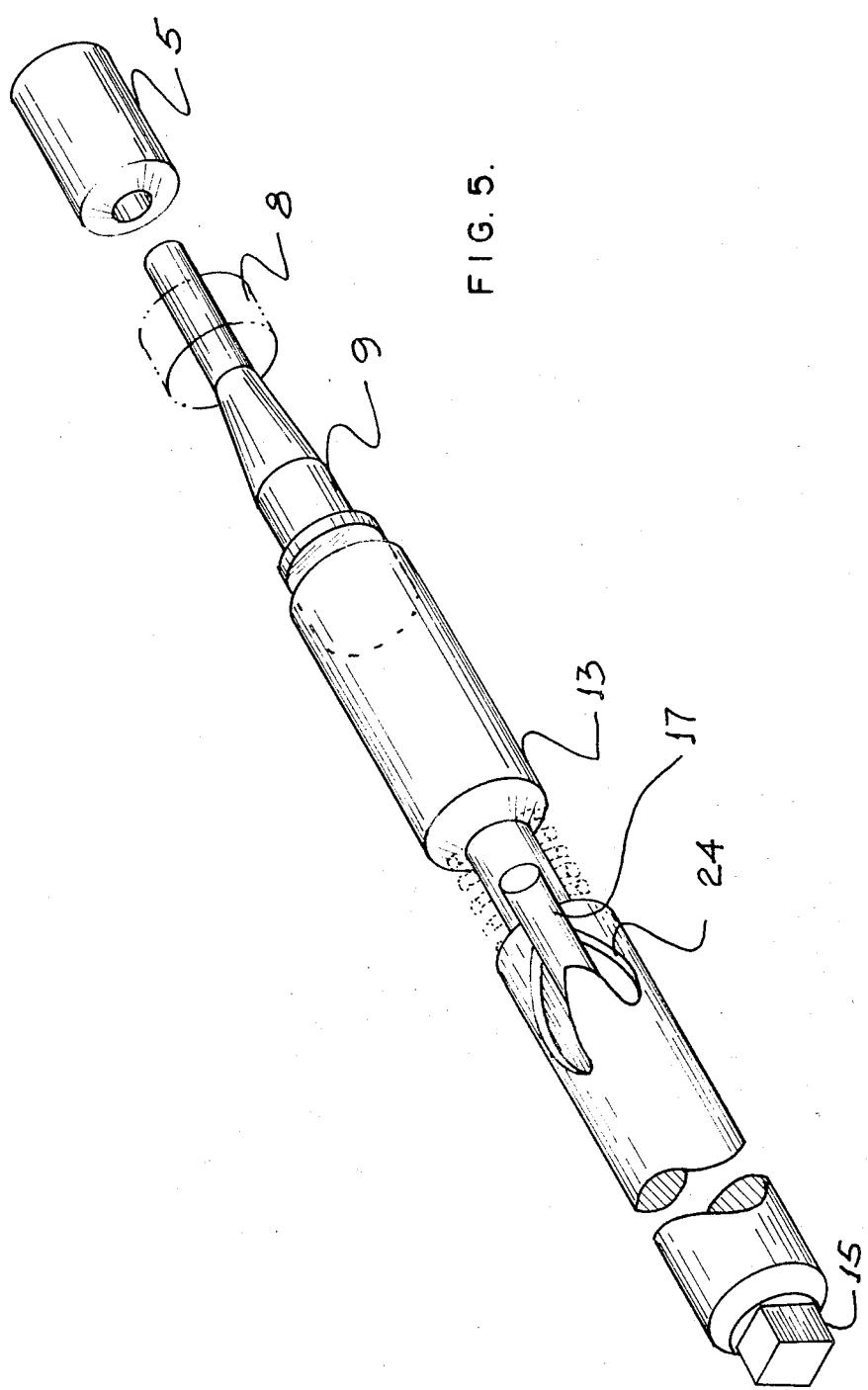
FIG. 5 is an oblique partial assembly.

Dowel pin holder (13) has an air cutout (20) and dowel pin hole (22). Cam return spring (14) surrounds reduced diameter end (23) of dowel pin holder (13). Cam (16) having tool holder (15), double helical cam surface (24) and recessed hole (25) surrounds reduced diameter portion (23) of dowel pin holder (13) and extends out of the end of housing (1). (Shown in FIG. 6) Dowel pin (17) extends through hole (22) and in cam (16) to operate in axial slots (18) in housing (1).

In operation the compression of spring (4) is adjusted by rotating cap (3) and adjusting its axial placement on housing (1). The device is held by rotating spindle (2) and housing (1). A tool is placed on tool holder (15), for example a socket or an ordinary screwdriver bit, and the tool is engaged with the head of a bolt or the kerf of a screw.

The housing is given a slight torque in the direction of desired rotation by operator and forced in an axial direction toward the bolt or screw. Cam (16) moves axially in housing (1) abutting dowel pin (17) which abuts reduced diameter portion (23) of dowel pin holder (13). Dowel pin holder (13) is forced axially in housing (1) and engages spherical portion (12) of punch (9) transmitting force axially in the housing (1) and moving axially in the housing (1). Punch (9) abuts inclined face (6) of hammer (5) forcing hammber (5) axially in the housing (1). Hammer (5) compreses spring (4) by moving axially in the housing and imparts kinetic energy to the spring which accumulated as potential energy. Punch (9) is held off center by the effect of off-center spring (10) until centering taper (11) engages stationary shoulder (8). As centering taper (11) passes by stationary shoulder (8), punch (9) is moved radially in the housing toward the center of the housing (1) and the end of punch (9) moves radially along inclined surface (6) of hammer (5) until it engages hole (7). At that time spring (4) releases its potential energy forcing hammer (5) axially in housing toward the workpiece. Recessed hole (7) in hammer (5) engages the punch (9) the end of which bottoms in the hammer (5) imparting kinetic energy to punch (9) and moving it axially toward the workpiece. Spherical surface (12) of punch (9) abuts dowel pin holder (13) forcing it axially toward the workpiece. Dowel pin (17) slides axially in slot (18) imparting its motion and energy to cam (16). Dowel pin (17) comes to rest prior to reaching the end of slot (18) expending its force on helical cam surface (24). The travel of dowel path (17) along cam surface (24) rotates cam (16) and forces tool holder (15) against the fastener. Cam (16) thus converts part of the axial motion and kinetic energy to a rotating motion and high torque of short duration and the remainder of its axial force vector toward the workpiece. After the spring (4) has been released transferring its potential energy bottoming dowel pin (17) at the end of cam (24) the device recycles itself through the action of cam return spring (14) which exerts sufficient force upon dowel pin holder (13) and cam (16) to return dowel pin (17) to its initial rest position at the portion of helical cam surface (24) furtherest away from tool holder (15).

The direction of rotation of cam (16) will be in the direction of housing (1) is biased by the operator at the start of the operation.

It is apparent that when sufficient compression is supplied to spring (4) that a torque having both high intensity and short duration can be applied to either increase the force with which an assembly is connected by a fastener or to loosen the fastener so that it may be removed.

If it is necessary to remove a fastener, for example a screw which has had the kerf completely destroyed, the operation of the mechanism can be modified slightly to cut a new kerf. Using a screw bit that is sharpened and has a slight left helix at the bit, the housing is pushed axially for several cycles which cuts a new kerf, the screw may then be removed by normal operation.

The mechanism is adopted to be used with a variety of sizes of fasteners both those requiring high torque and low torque. By rotating spring compression adjusted cap (3) a predetermined amount of torque is applied consistently to the fastener in proportion to the compression imparted to the spring (4). The device may therefore be adjusted to impart a predetermined calibrated amount of torque to a fastener and take the place of a conventional torque wrench.

It is apparent that the inclination of helical cam surface (25) may be varied to adjust the proportion between rotational travel, torque applied to the workpiece and axial force. Normally an inclination of 45° from the axis of the housing is used.

It is apparent to one skilled in the art that modifications and variations to the invention described are possible within the spirit of the invention and the invention is not to be limited by the above description but only by the scope of the appended claims and their reasonable equivalents.

I claim:

1. A device having a hollow body, a spring axially positioned in one end of the body, an adjustable cap movably attached to one end of the body and adapted to adjust axially in relation to the housing and compress the spring, a hammer slidingly positioned in the housing and abutting the end of the spring opposite the spring adjustment cap, the hammer having an axial cavity opening from the side of the hammer opposite the spring. The hammer also having a conical face, surrounding the axial cavity and having its convergent point furtherest from the spring, a collar positioned in the body and spaced from the conical face end of the hammer, a punch having a first end extending axially through the collar and abutting the conical face of the hammer slidably mounted within the body, an off-center spring surrounding the punch and compressed between the collar and a second flange on the opposite end of the punch and biasing the first end of the punch toward the housing, a centering taper on the punch and axially positioned between the ends of the punch, a dowel pin holder axially and slidingly positioned in the body and abutting the second end of the punch, the dowel pin holder having a reduced diameter portion spaced from the second end of the punch and surrounded by a cam return spring and also surrounded by a cam slidably mounted within the body, the cam return spring being operatively positioned between the cam and the dowel pin holder, with the spring surrounding the reduced diameter portion of the dowel pin holder, the cam having double helical cam surfaces adjacent to the dowel pin holder, the portion of the body adjacent to the cam having parallel axial slots adjacent to the cam surfaces, the reduced diameter portion of the dowel pin holder having a hole positioned adjacent to the double helical cam surfaces and extending in a direction perpendicular to the axis and cooperating with the cam double helical surfaces and axial slots in the body to create a passage through the body, a dowel pin positioned in the passage and adapted to move axially in the axial slots and along the helical cam surfaces, the device having a tool connected to the end of the cam opposite the cam return spring.

2. In a device of the type for applying an axial force and a torque force to a tool, the improvement comprising resilient means for storing potential energy in the device release means for suddenly converting the potential energy to kinetic energy and means for converting the kinetic energy to axial force and torque force.

3. The device of claim 2 wherein the resilient means for storing potential energy accumulates a gradual application of force.

4. The device of claim 2 wherein the resilient means for storing potential energy is a spring.

5. The device of claim 4 wherein the spring activates a movable hammer which is released by the release means to convert the potential energy to kinetic energy.

6. The device of claim 5 wherein the hammer engages the release means for converting kinetic energy into axial force and torque force.

7. The device of claim 6 wherein the means for converting kinetic energy to an axial force and a torque force includes a cam adapted to receive the kinetic energy from the hammer and convert the kinetic energy to an axial force and a torque force.

8. The device of claim 7 wherein the cam has double helical cam surfaces, whereby the torque force can be selectively applied in clockwise or counterclockwise direction.

9. The device of claim 7 wherein the means of converting kinetic energy to an axial force and a torque force includes means for transmitting the kinetic energy from the hammer to the cam.

10. The device of claim 9 wherein the means of transmitting kinetic energy from the hammer to the cam is adapted to transmit an axial force from the tool through the cam to the hammer and the hammer is adapted to transmit the force to the spring and the spring is adapted to store the force as potential energy by being compressed.

11. The device of claim 10 wherein the means of transmitting kinetic energy from the hammer to the cam cooperates with the hammer to suddenly release the potential energy stored in the spring and convert it to kinetic energy by engaging an axial recessed hole partially through the hammer.

12. The device of claim 11 wherein the means of transmitting kinetic energy from the hammer to the cam is forced into engagement with the axial hole in the hammer by a collar.

13. The device of claim 11 wherein the means of transmitting kinetic energy from the hammer to the cam includes a punch having a centering taper.

14. The device of claim 13 wherein the punch is surrounded by off-center spring compressed between the collar and a flange located on the punch.

15. The device of claim 2 wherein the device has an adjusting cap to precompress the resilient means a predetermined amount.

* * * * *